US006986709B2

(12) United States Patent
Hughs-Baird et al.

(10) Patent No.: US 6,986,709 B2
(45) Date of Patent: Jan. 17, 2006

(54) GAMING DEVICE HAVING GAMES WITH VARIABLE GAME FUNCTIONS

(75) Inventors: Andrea C. Hughs-Baird, Reno, NV (US); Ryan William Cuddy, Rene, NV (US); Brian Daniel Swift, Sparks, NV (US)

(73) Assignee: IGT, Reno, NV (US)

( * ) Notice: Subject to any disclaimer, the term of this patent is extended or adjusted under 35 U.S.C. 154(b) by 68 days.

(21) Appl. No.: 09/960,879

(22) Filed: Sep. 21, 2001

(65) Prior Publication Data

US 2003/0060252 A1 Mar. 27, 2003

(51) Int. Cl.
*A63F 13/00* (2006.01)
(52) U.S. Cl. .................................................... 463/16
(58) Field of Classification Search .................... 463/1, 463/9–11, 13, 16–20, 21, 22, 25–31, 37, 43; 273/138.1, 138.2, 139, 269, 292, 293, 143 R
See application file for complete search history.

(56) References Cited

U.S. PATENT DOCUMENTS 4,448,419 A 5/1984 Telnaes
4,624,459 A 11/1986 Kaufman
4,695,053 A 9/1987 Vazquez, Jr. et al.
5,397,125 A 3/1995 Adams
5,456,465 A 10/1995 Durham
5,524,888 A 6/1996 Heidel
5,711,525 A 1/1998 Breeding
5,788,573 A 8/1998 Baerlocher et al.
5,823,874 A 10/1998 Adams
5,833,537 A 11/1998 Barrie
5,873,781 A 2/1999 Keane
5,967,894 A 10/1999 Kinoshita et al.
6,015,346 A 1/2000 Bennett
6,059,289 A 5/2000 Vancura
6,062,980 A 5/2000 Luciano
6,089,976 A 7/2000 Schneider et al.
6,089,977 A 7/2000 Bennett
6,102,798 A 8/2000 Bennett
6,110,041 A 8/2000 Walker et al.
6,117,009 A * 9/2000 Yoseloff ...................... 463/20
6,120,031 A 9/2000 Adams
6,135,885 A 10/2000 Lermusiaux
6,142,874 A 11/2000 Kodachi et al.
6,146,273 A 11/2000 Olsen
6,155,925 A * 12/2000 Giobbi et al. ................. 463/20
6,159,096 A 12/2000 Yoseloff (Continued)

FOREIGN PATENT DOCUMENTS

EP 0945 837 A2 3/1999

(Continued)

OTHER PUBLICATIONS

The $1,000,000 Pyramid Brochure written by IGT, published in 2001.

(Continued)

*Primary Examiner*—Kim Nguyen
(74) *Attorney, Agent, or Firm*—Bell, Boyd & Lloyd LLC

(57) ABSTRACT

The present invention includes a gaming device which includes a plurality of game functions for a single game and a probability associated with each game function. After a predetermined event occurs, the processor uses the probabilities to generate a particular game function for a player to use. Preferably, the predetermined event is a game triggering event. The processor can generate different game functions for a single game from predetermined event to predetermined event. This type of gaming device increases the interest and entertainment of gaming device players.

4 Claims, 5 Drawing Sheets

| GAME FUNCTION | NUMBER OF PLAYER INPUTS (1 INPUT = 1 CIRCLE) | PROBABILITY |
|---|---|---|
| 1 | OO | 3% |
| 2 | OOOO | 40% |
| 3 | OOO | 25% |
| 4 | O | 2% |
| 5 | OOOOO | 30% |

| GAME FUNCTION | TYPE OF SCENARIO | PROBABILITY |
|---|---|---|
| 1 | CHARACTER CHASE | 10% |
| 2 | SHOOT THE ARROW | 25% |
| 3 | FIND THE TREASURE | 5% |
| 4 | WIN THE BATTLE | 60% |

U.S. PATENT DOCUMENTS

| | | | | |
|---|---|---|---|---|
| 6,159,097 | A | 12/2000 | Gura | |
| 6,159,098 | A | 12/2000 | Slomiany et al. | |
| 6,174,233 | B1 | 1/2001 | Sunaga et al. | |
| 6,174,235 | B1 | 1/2001 | Walker et al. | |
| 6,186,894 | B1 | 2/2001 | Mayeroff | |
| 6,190,255 | B1 * | 2/2001 | Thomas et al. | 463/20 |
| 6,200,217 | B1 | 3/2001 | Osawa | |
| 6,203,429 | B1 | 3/2001 | Demar et al. | |
| 6,224,483 | B1 * | 5/2001 | Mayeroff | 463/20 |
| 6,231,442 | B1 | 5/2001 | Mayeroff | |
| 6,231,445 | B1 | 5/2001 | Acres | |
| 6,234,897 | B1 | 5/2001 | Frohm et al. | |
| 6,238,288 | B1 | 5/2001 | Walker et al. | |
| 6,267,669 | B1 | 7/2001 | Luciano, Jr. et al. | |
| 6,358,147 | B1 | 3/2002 | Jaffe et al. | |
| 6,371,856 | B1 * | 4/2002 | Niwa | 463/43 |
| 6,375,187 | B1 | 4/2002 | Baerlocher | |
| 6,565,436 | B1 | 5/2003 | Baerlocher | |
| 6,739,973 | B1 | 5/2004 | Lucchesi et al. | |
| 6,767,283 | B1 * | 7/2004 | Weiss | 463/16 |
| 2003/0027617 | A1 * | 2/2003 | Vancura | 463/16 |
| 2003/0060266 | A1 | 3/2003 | Baerlocher | |

FOREIGN PATENT DOCUMENTS

| | | |
|---|---|---|
| WO | PCT/AU97/00121 | 2/1997 |
| WO | WO 00/12186 | 3/2000 |

OTHER PUBLICATIONS

Big Bang Piggy Banking Brochure written by WMS Gaming, Inc., published prior to 2001.

Fortune Cookie Brochure written by IGT, published in 2000.

Jackpot Party Brochures and Articles written by WMS Gaming, Inc., published in 1998, 1999, 2001.

Fortune Hunter Brochure written by Aristocrat, published in 1995.

Neon Nights Brochure written by IGT, published in 2000.

Jazzy Jackpots Article written by Strictly Slots, published in 2001.

Jazzy Jackpots Advertisements written by Atronic, published in 2000.

* cited by examiner

FIG.3

| GAME FUNCTION | NUMBER OF PLAYER INPUTS (1 INPUT = 1 CIRCLE) | PROBABILITY |
|---|---|---|
| 1 | OO | 3% |
| 2 | OOOO | 40% |
| 3 | OOO | 25% |
| 4 | O | 2% |
| 5 | OOOOO | 30% |

FIG.4

| GAME FUNCTION | TYPE OF SCENARIO | PROBABILITY |
|---|---|---|
| 1 | CHARACTER CHASE | 10% |
| 2 | SHOOT THE ARROW | 25% |
| 3 | FIND THE TREASURE | 5% |
| 4 | WIN THE BATTLE | 60% |

GAMING DEVICE HAVING GAMES WITH VARIABLE GAME FUNCTIONS

CROSS REFERENCE TO RELATED APPLICATIONS

This application is related to the following co-pending commonly owned patent applications: "GAMING DEVICE HAVING SELECTIVELY ACCESSIBLE BONUS SCHEME," Ser. No. 09/657,916, "GAMING DEVICE HAVING A WEIGHTED PROBABILITY FOR SELECTING A BONUS GAME," Ser. No. 09/680,346, now U.S. Pat. No. 6,565,436; "GAMING DEVICE HAVING A WEIGHTED PROBABILITY FOR SELECTING A BONUS GAME," Ser. No. 10/414,638, "GAMING DEVICE HAVING A METHOD FOR RANDOMLY GENERATING A BONUS ROUND OUTCOME," Ser. No. 09/679,251, now U.S. Pat. No. 6,569,016; "GAMING DEVICE HAVING A METHOD FOR RANDOMLY GENERATING A BONUS ROUND OUTCOME," Ser. No. 10/437,656, "GAMING DEVICE HAVING A BONUS ROUND WITH MULTIPLE RANDOM AWARD GENERATION AND MULTIPLE RETURN/RISK SCENARIOS, Ser. No. 09/678,989, "GAMING DEVICE HAVING MULTIPLE AUDIO, VIDEO OR AUDIO-VIDEO EXHIBITIONS ASSOCIATED WITH RELATED SYMBOLS," Ser. No. 09/689,529, now U.S. Pat. No. 6,554,708; "GAMING DEVICE HAVING CHANGED OR GENERATED PLAYER STIMULI," Ser. No. 09/686,244, "GAMING DEVICE HAVING RELATED MULTI-GAME BONUS SCHEME," Ser. No. 09/688,972; "GAMING DEVICE INCLUDING AWARDS THAT GENERATE ANOTHER AWARD," Ser. No. 09/966,663, "GAMING DEVICE HAVING IMPROVED OFFER AND ACCEPTANCE BONUS SCHEME," Ser. No. 09/680,630, now U.S. Pat. No. 6,375,187; "GAMING DEVICE INCLUDING CHOICES HAVING VARYING PROBABILITIES OF CONTRIBUTING TO GAME'S TERMINATION," Ser. No. 09/957,308, and "GAMING DEVICE HAVING TERMINATION VARIABLES," Ser. No. 09/966,658, now U.S. Pat. No. 6,607,438; "METHOD OF OPERATING A GAMING DEVICE HAVING TERMINATION VARIABLES." Ser. No. 10/429,001.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which provides games which have variable game functions, such as variable player inputs.

BACKGROUND OF THE INVENTION

Many existing gaming machines, such as traditional slot machines, include bonus round games in addition to primary games. Typically, a bonus round game begins when a player reaches a bonus triggering event in the primary game of the gaming machine. In slot machines with reels, the triggering event usually occurs when the player reaches a predetermined symbol or combination of symbols on the reels. The bonus scheme generally provides the player with an opportunity to gain bonus value before the bonus round terminates. Known primary games and bonus round games include game functions, such as a predetermined number of player inputs a player can make in order to obtain values. This number is generally fixed for any one game.

To increase player enjoyment and excitement, it is desirable to provide players with new gaming devices which provide players with new games.

SUMMARY OF THE INVENTION

The present invention provides a gaming device which includes a plurality of variable game functions for a single game. Each game function is associated with a predetermined probability which the gaming device processor uses to generate particular game functions. The term game function, as used herein, includes game factors or parameters, including: (a) predetermined numbers of player inputs which a player can make; and (b) predetermined game scenarios.

In one embodiment, the game functions are different numbers of player inputs which a player can make in order to gain values. For example, a first game function may enable a player to make three player inputs, a second game function may enable a player to make two player inputs and a third game function may enable a player to make five player inputs. The probabilities associated with each game function preferably vary from game function to game function. In the above example, the first game function could be associated with a probability of twenty percent, the second game function could be associated with a probability of fifty percent and the third game function could be associated with a probability of thirty percent. The probabilities are included in one or more mathematical formulas which the processor of the gaming device uses to determine whether or not a player will obtain a particular game function for a particular game. The higher the probability, the more likely that a player will obtain a particular game function.

In operation, a game triggering event occurs causing a primary game or bonus round to initiate. The processor, taking into account the game functions and associated probabilities, performs one or more calculations to generate a particular game function for the player. For example, once the triggering event occurs, the processor performs its calculation, and the gaming device may enable the player to make three player inputs or selections in the game. Preferably, a player makes each input by pushing a play button or other type of activator. After the game terminates, the next time a player reaches a game triggering event in this gaming device, the processor again generates a particular game function, taking into account the game functions and associated probabilities. For example, in the next game, the gaming device may enable the player to make five inputs or selections in the game. Thus, each game is somewhat different for the player because the game functions change and the player does not know which game functions will be employed in the game until the player plays the game.

The gaming device of the present invention thus includes a plurality of game functions for a player in a primary game or bonus round game. Each game function is associated with a probability, and the processor generates particular game functions taking into account these probabilities. As such, the gaming device can provide players with game functions which vary depending upon the occasion on which a game is played. In one preferred embodiment, the game functions vary only in the number of player inputs each time the game is played. This type of gaming device provides players with varying game functions and increases the interest and enjoyment for gaming device players.

It is therefore an advantage of the present invention to provide a gaming device having games with variable game functions.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 3 is a table illustrating an example of variable game functions and particularly variable numbers of player inputs and associated probabilities;

FIG. 4 is a table illustrating another example of variable game functions and particularly variable scenario types and associated probabilities.

DETAILED DESCRIPTION OF THE INVENTION

Gaming Device and Electronics

Figure 1A:
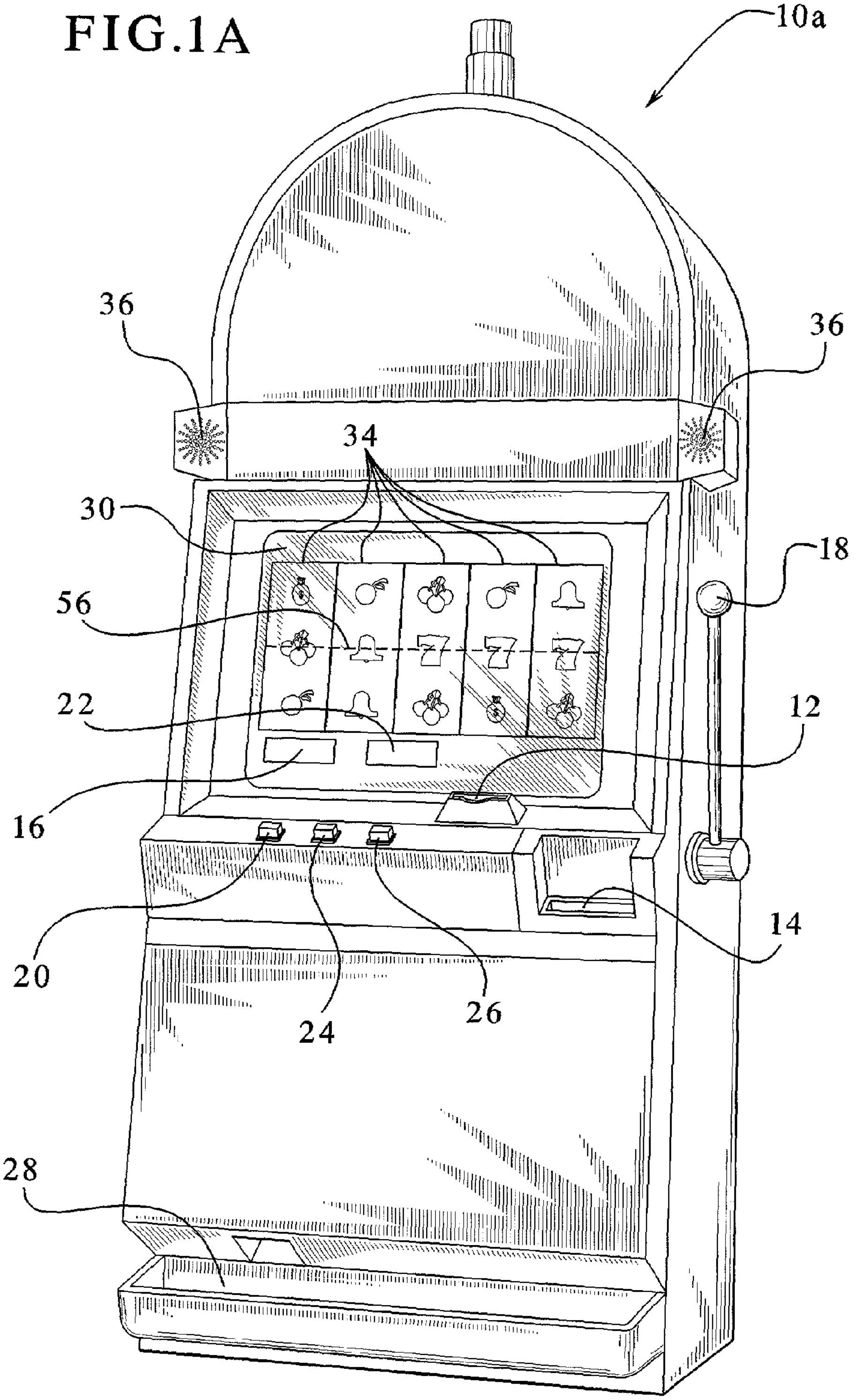
FIG. 1A is a perspective view of one embodiment of the gaming device of the present invention.
Figure 1B:
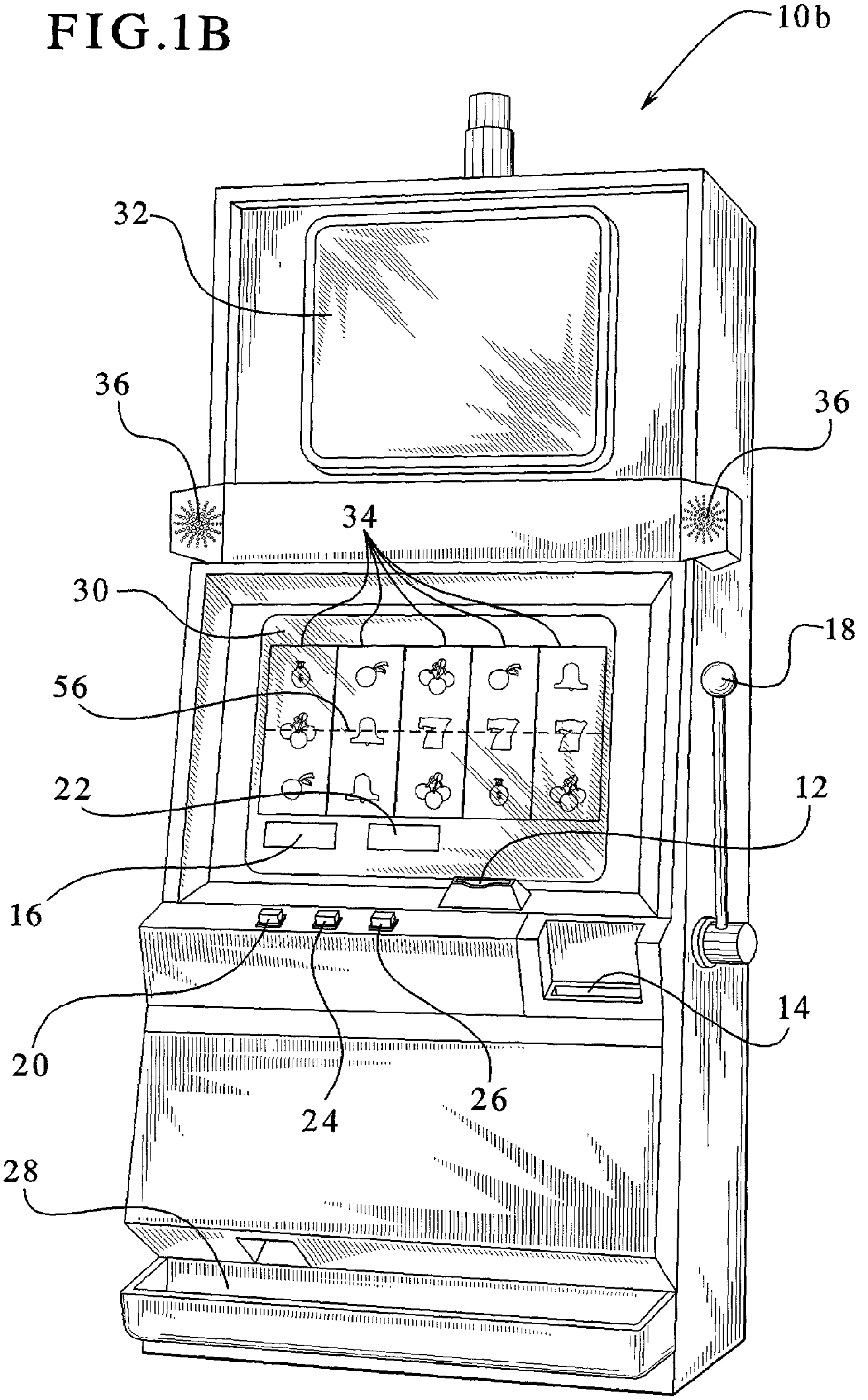
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 preferably has controls, displays and features of a conventional slot or other gaming machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, blackjack, poker and keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. In the slot embodiment, gaming device 10 displays a plurality of reels 34, such as three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
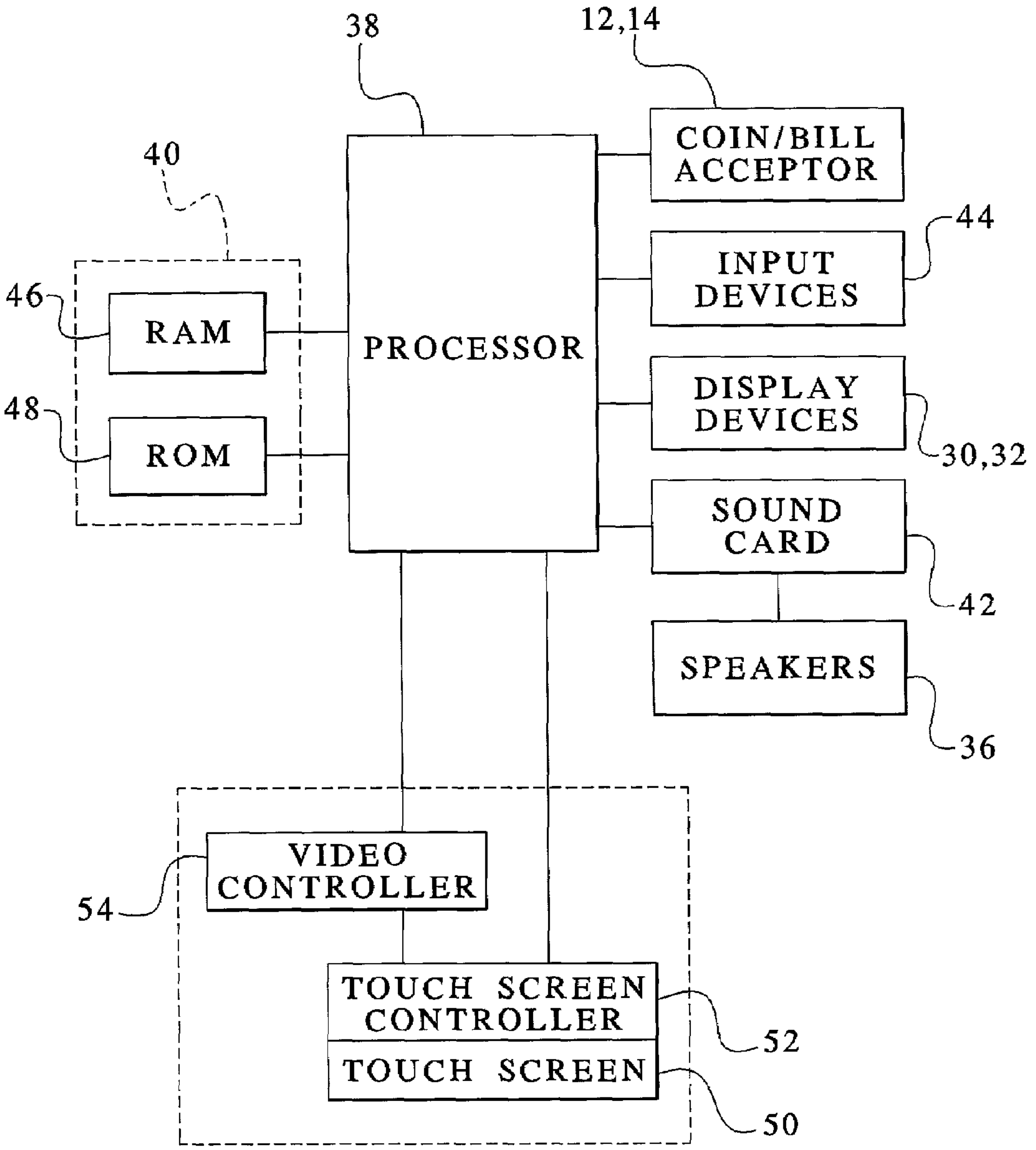
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate locations. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, the gaming device 10 may also give players the opportunity to win credits in a bonus round. This type of gaming device 10 will include a program which will automatically begin a bonus round when the player has achieved a qualifying condition in the game. This qualifying condition can be a particular arrangement of one or more indicia on a display device. The gaming device 10 may use a video-based central display device 30 to enable the player to play the bonus round. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Variable Game Functions

The gaming device of the present invention includes a plurality of variable game functions for a single game. Each game function is associated with a predetermined probability. This probability and function information is stored as data in the memory device and is at times referred to herein as probability-function data. The processor of the gaming device, retrieving and using the probability-function data, performs one or more calculations to generate each particular game function for a player. Preferably, the processor randomly generates each particular game function.

It is also preferable that the processor performs this calculation only once, immediately following a game triggering event. However, it should be appreciated that the present invention can be adapted so that the processor generates a game function on multiple occasions during a game when predetermined events occur. In this case, a player's game function would change from time to time during a game.

For example, in one embodiment a player may start a game being able to make three player inputs. Then, if a predetermined event occurs, the gaming device may enable the player to make five player inputs in addition to the previous three player inputs. In any case, after the processor generates a particular game function, the gaming device enables the player to use this game function during the game. After the player does so, eventually the game terminates. When a player plays the same gaming device another time, and a game triggering event occurs, the processor will again generate a particular game function in a similar fashion. Since the processor bases its calculation on the probability-function data, it is possible for the same gaming device to provide players with different game functions for the same game.

In one embodiment, the gaming device of the present invention provides players with variable game functions in bonus round games. The gaming device preferably provides the player with a game function once the bonus round is triggered. In a primary game embodiment, the gaming device preferably provides the player with a game function once the primary game is triggered.

One bonus round embodiment of the gaming device of the present invention is illustrated in the table in FIG. 3. In this embodiment, each game function is a variable or different number of player inputs. Each game function is associated with a different predetermined probability. As illustrated in FIG. 3, the sum of the probabilities is one hundred percent.

If the processor generates the second game function, the gaming device enables the player to make four inputs during the bonus round. If the processor generates the fourth game function, the gaming device enables the player to make one input during the bonus round. A game developer can use different probabilities in association with different game functions for various purposes. In the example illustrated in FIG. 3, relatively lower probabilities are associated with game functions one and three which provide players with two inputs and one input, respectively. Higher probabilities are associated with game functions two, three and five. Due to the predetermined probabilities in this example, it is likely that the gaming device will enable a player to make either four or five inputs during a bonus round.

As illustrated in FIG. 4, the game functions can vary in factors other than numbers of player inputs. The game functions can vary in relation to the type of game scenario. Each such game function is associated with a probability, each of which vary from one another. Different game functions can include varying game scenarios which incorporate different symbols, game variations, screens, sounds, themes and graphics. The various scenarios in this embodiment are illustrated in FIG. 4 as "character chase," "shoot the arrow," "find the treasure" and "win the battle." In one example, the character chase scenario could include a player's character chasing another character along a path in a desert. The graphics could include desert scenery, such as sand and cactuses. The win the battle scenario could include a player shooting at an enemy ship, including battle graphics and sounds.

In the example illustrated in FIG. 4, a player is most likely to obtain game function four, associated with the highest probability of sixty percent. A player is least likely to obtain game function three, associated with the lowest probability of five percent. Game functions of a common type can be described as game function sets. For example, FIGS. 3 and 4 illustrate three different game function sets. The examples used and described in FIGS. 3 and 4 are provided merely for illustrative purposes. Embodiments of the present invention can include any number of game functions and associated probabilities, for instance involving any number of player inputs or any type of game scenario. It should be appreciated that the game device processor can generate a single game function or multiple game functions at one time. For example, the processor may generate three player inputs and a particular scenario type on one occasion, and on another occasion the gaming device processor may generate six player inputs and a different scenario type.

Figure 5:
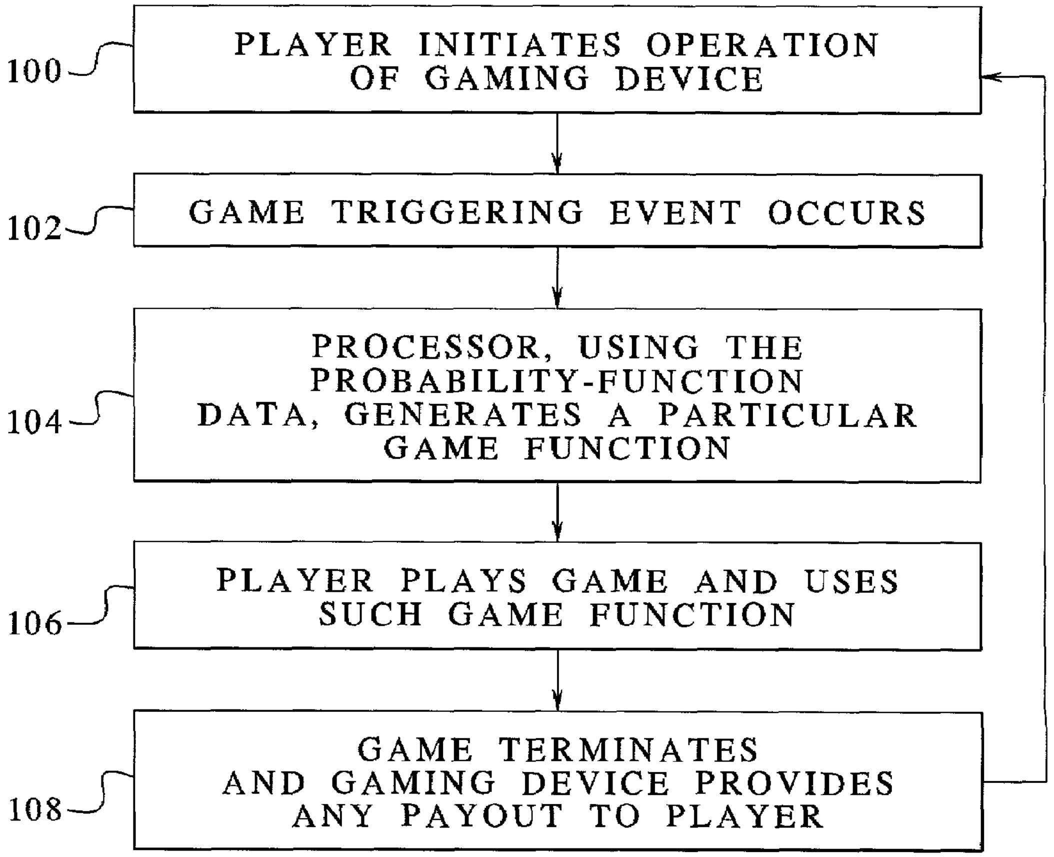
FIG. 5 is a flow diagram of one embodiment of the present invention.

With reference to FIG. 5, in one embodiment, in operation a player activates the operation of the gaming device by depositing the appropriate amount of currency, as indicated by block 100. Once a game triggering event occurs, the processor, using the probability-function data, generates a particular game function, as indicated by blocks 102 and 104. A player then plays the game using the game function, as indicated by block 106. Eventually, the game terminates and the gaming device provides the player with any payout due to the player, as indicated by block 108. The next time a player operates the same gaming device, this entire process will repeat itself, as indicated by blocks 108 and 100. In this fashion, the same gaming device can provide game functions for a single game which vary from occasion to occasion.

In one embodiment, the game functions vary only in the number of player inputs and the inputs comprise the number of times a player can attempt to reach a character by pushing a play button. The gaming device awards the player with predetermined bonus values associated with each successful reach. After the player uses all of the inputs, the bonus round terminates and the player receives any earned payout.

Likewise, in another embodiment, the game functions vary only in the number of player inputs. However, here the inputs comprise the number of times a player can throw a weapon at a character, specifically a robot. The gaming device awards the player with predetermined bonus values associated with the destruction of the robot. After the player has thrown a weapon a predetermined number of times, the bonus round terminates and the player receives any earned payout.

The gaming device of the present invention includes game functions for a single game which can vary from instance to instance. In a preferred embodiment, these game functions vary only in the number of player inputs which a player can make during a game. Each of the game functions are associated with various predetermined probabilities. The processor of the gaming device generates a particular game function when a predetermined event occurs. In generating this game function, the processor takes into account the probability-function data. The gaming device of the present invention provides players with game functions which can vary each time a player operates a gaming device. Alternatively, the present invention provides the players with multiple sets of game functions which vary each time a player operates a gaming device. This variation increases the entertainment, interest and enjoyment experienced by gaming device players.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A gaming device operable under control of a processor, the gaming device comprising:

at least one input device operable to communicate with the processor;

at least one display device controlled by the processor;

a primary game controlled by the processor, operable upon a wager and displayable by the at least one display device;

a secondary game controlled by the processor and displayable by the at least one display device;

a plurality of secondary game functions, at least two of said secondary game functions being different, wherein at least two of the different secondary game functions include:

(a) different predetermined numbers of player inputs which a player can make using the at least one input device, or (b) different predetermined secondary game scenarios which are displayable by the at least one display device;

a plurality of probabilities, at least two of said probabilities being different, wherein each one of the secondary game functions is associated with one of the probabilities;

a plurality of outcomes, at least two of said outcomes being different, and wherein for each play of the primary game and each play of the secondary game, one of said outcomes is selected and said processor causes the at least one display device to display the selected outcome and provides the selected outcome to a player for said play of the primary game or the play of said secondary game; and a secondary game triggering event, wherein for each occurrence of said secondary game triggering event the processor selects, independent of any of the outcomes of any play of the primary game, at least one of the secondary game functions based on the probabilities associated with the secondary game functions, and said processor operates a play of the secondary game using said selected secondary game function.

2. The gaming device of claim 1, wherein the secondary game triggering event is based on a primary game outcome.

3. A method of operating a gaming device, said method comprising:

providing a primary game operable upon a wager;

providing a secondary game;

providing a plurality of secondary game functions, at least two of said secondary game functions being different, wherein at least two of the different secondary game functions include:

(a) different predetermined numbers of player inputs which a player can make using the at least one input device, or (b) different predetermined secondary game scenarios which are displayable by the at least one display device;

providing a plurality of probabilities, at least two of said probabilities being different, wherein each one of the secondary game functions is associated with one of the probabilities;

providing a plurality of outcomes, at least two of said outcomes being different, for each play of the primary game and each play of the secondary game, selecting one of said outcomes, displaying the selected outcome, and providing the selected outcome to a player for said play of the primary game or the play of said secondary game; and providing a secondary game triggering event, wherein for each occurrence of said secondary game triggering event, selecting, independent of any outcome of any play of the primary game, at least one of the secondary game functions based on the probabilities associated with the secondary game functions, and operating a play of the secondary game using said selected secondary game function.

4. The method of claim 3, wherein the secondary game triggering event is based on a primary game outcome.

* * * * *